United States Patent
Sumanth

(10) Patent No.: US 9,077,614 B2
(45) Date of Patent: Jul. 7, 2015

(54) PRIORITIZING NETWORK FAULTS

(71) Applicant: Hewlett-Packard Development Company, L..P., Houston, TX (US)

(72) Inventor: N Sumanth, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 263 days.

(21) Appl. No.: 13/717,093

(22) Filed: Dec. 17, 2012

(65) Prior Publication Data

US 2014/0172842 A1 Jun. 19, 2014

(51) Int. Cl.
*H04L 12/24* (2006.01)
*H04L 12/26* (2006.01)

(52) U.S. Cl.
CPC ............. *H04L 41/0609* (2013.01); *H04L 41/06* (2013.01); *H04L 43/08* (2013.01); *H04L 43/0829* (2013.01); *H04L 43/0864* (2013.01); *H04L 43/087* (2013.01)

(58) Field of Classification Search
CPC ..................... G06F 17/30598; G06F 17/30705
USPC .................................. 707/694, 737
See application file for complete search history.

(56) References Cited

U.S. PATENT DOCUMENTS

| | | | |
|---|---|---|---|
| 6,125,458 A | 9/2000 | Devan et al. | |
| 7,096,153 B2 | 8/2006 | Guralnik et al. | |
| 7,131,037 B1 | 10/2006 | LeFaive et al. | |
| 7,504,936 B2 | 3/2009 | Miller et al. | |
| 8,135,990 B2 | 3/2012 | Vankov et al. | |
| 2008/0307269 A1* | 12/2008 | Bennett et al. | 714/47 |
| 2011/0090800 A1 | 4/2011 | Isaksson et al. | |

OTHER PUBLICATIONS

Cramer Amdocs OSS Division, Assuring The Customer Experience, 15 pages, http://www.amdocs.com/Whitepapers/General/wpAssuringTheCustomerExperience, Effective date Sep. 2006.

* cited by examiner

*Primary Examiner* — Thu-Nguyet Le
(74) *Attorney, Agent, or Firm* — International IP Law Group

(57) ABSTRACT

An exemplary embodiment of the present invention provides a method and system for prioritizing network failures. The method includes assigning a category to a network fault. The method also includes determining an incident score for the network fault within the category. The method also includes generating a normalized score by normalizing the incident score with a plurality of other incident scores in the category. The method further includes using the normalized score to rank the network fault among a plurality of other network faults of other different categories.

20 Claims, 5 Drawing Sheets

PRIORITIZING NETWORK FAULTS

BACKGROUND

Managing large networks can be complex as new network gears and new services are deployed. As a large network becomes more complex, the number of faults in the network grows. An operator of a large network may have to deal with up to thousands of network faults occurring simultaneously. The thousands of network faults can vary in severity of degradation, and can fall into a number of categories.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The present disclosure relates to techniques for ranking network faults occurring in a network. In some embodiments, network faults are classified into a number of categories, and the network faults are ranked within each category. The intra-category ranking of each network fault can be used to determine the overall inter-category rankings of the network faults.

The techniques used herein can be used to bring to attention the most severe network faults in each category. In some embodiments, network faults can be classified into the following categories: network failures, performance faults, security violations, and service impacts. A network failure, as referred to herein, is a failure that occurs at a node supporting one or more links, or at a link (also referred to as an interface). A performance fault, as referred to herein, occurs when a threshold for a measured variable, such as round trip time, is breached. A security violation, as referred to herein, is an excessive flow of traffic that results in a Denial-of-Service (DoS). A service impact, as referred to herein, occurs when deployed service, such as a virtual private network (VPN), is down or affected.

Prioritizing network faults can help a network operator focus on remedying the most severe network faults first. Ranking across multiple categories can help ensure that the most severe network faults of each category are high in priority. The method can be easily implemented and quickly executed without requiring extensive domain knowledge or training. The method is extensible, meaning that new services, elements, rule sets, and categories can be added easily.

Figure 1:
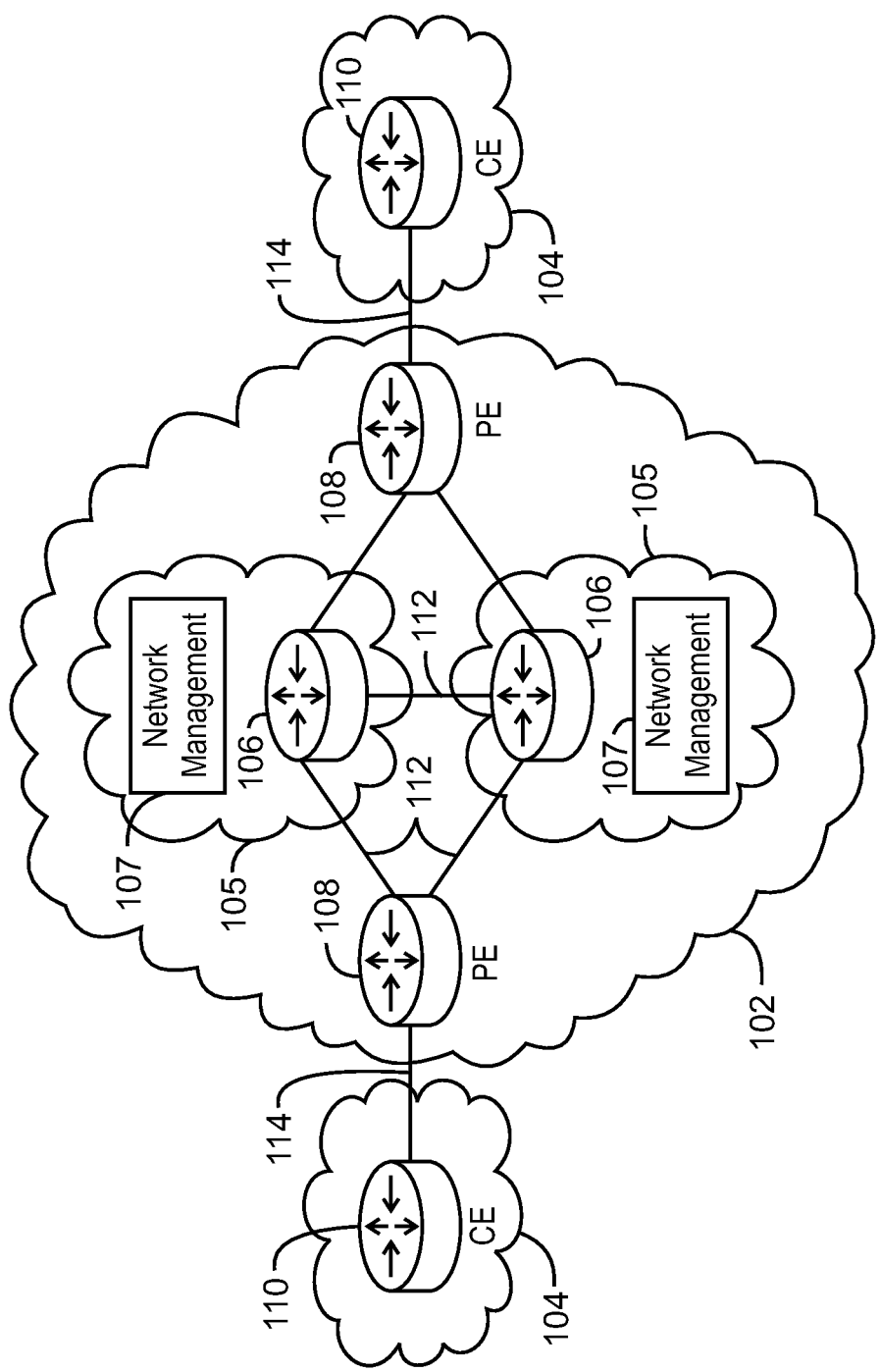
FIG. 1 is a block diagram of a large network configured to detect and prioritize network faults.

FIG. 1 is a block diagram of a large network configured to detect and prioritize network faults. The large network 100 is one embodiment of a network that may experience a large numbers of network faults. The large network 100 may include a provider network 102 communicatively connected to one or more customer networks 104. The provider network 102 may be an autonomous system. An autonomous system is defined as a network or collection of networks controlled by a network operator on behalf of a single administrative entity. The provider network 102 can be configured to send and receive packets of information to and from the customer networks 104. The customer networks 104 may also be autonomous systems.

The provider network 102 may include a number of local networks 105, each represented by a router 106. One or more of the local networks can include a network management system 107. The provider network 102 may also contain provider edge routers 108 for sending and receiving packets of information to and from customer edge routers 110 in customer networks 104.

Each of the routers 106 and provider edge routers 108 in the provider network may be connected to one another via inter-region links 112. The inter-region links 112 can transfer information from one router to another within the provider network. The provider edge routers 108 and customer edge routers 110 may be connected to one another via inter-AS links 114. The inter-AS links 114 can transfer information from one autonomous system to another. The inter-AS links 114, may transfer information from a provider edge router 108 to a customer edge router 110 and vice versa.

The network management system 107 can be configured to detect and prioritize network faults. The network management system 107 is described further in relation to FIGS. 2 and 3.

Figure 2:
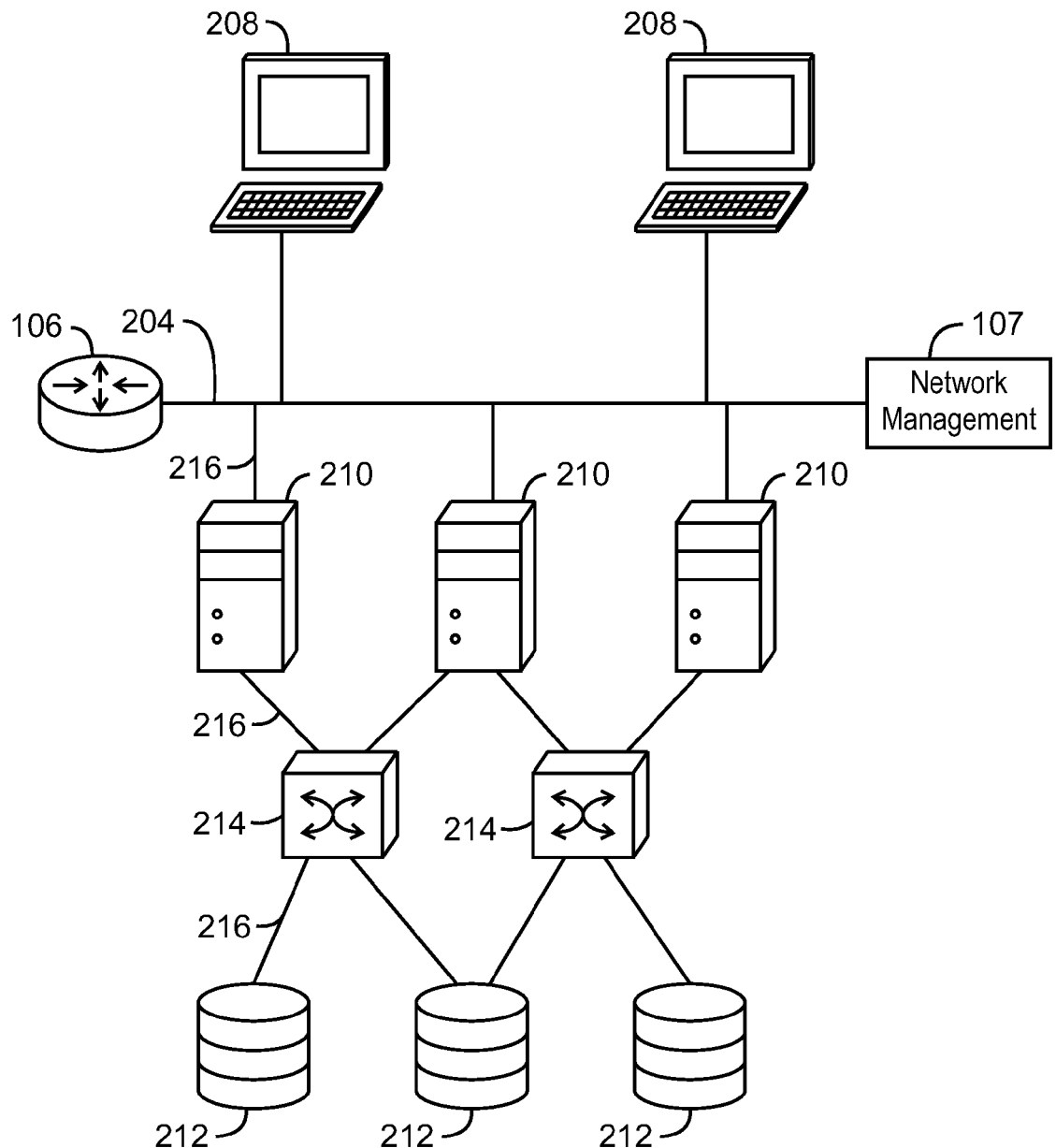
FIG. 2 is a block diagram of a local network configured to detect and prioritize network faults in a large network.

FIG. 2 is a block diagram of a local network configured to detect and prioritize network faults in a large network. The local network 105 may include a router 106, a network line 204, and a network management system 107 connected to the network line 204. The router 106 can act as a port for the local network 105, transmitting and receiving information in a larger network such as the autonomous system 100 illustrated in FIG. 1. The network line 204 can distribute information packets to various nodes contained in the local network 105.

The nodes supported by the local network 105 may include computers 208, servers 210, data storage devices 212, and switchers 214 connected to one another by L2 links 216. The computers 208, servers 210, and data storage devices 212 can serve as end nodes. An L2 link 216 is an interface between nodes that has lower priority than inter-AS or inter-region links.

A switcher 214 is a device that can receive, transmit, and forward packets of information between different devices in a network. In the embodiment shown in FIG. 2, the switchers 214 are linked to the servers 210 and data storage devices 212. The switchers 214 may transfer information stored in the data storage devices 212 to the servers 210, or send information sent from the servers 210 to be saved in the data storage devices 212 for future access. As a node, a switcher 214 may have higher priority than an end node device such as a computer 208, server 210, or data storage device 212.

The network management system 107 can be used to detect, classify, and prioritize network faults that occur in the autonomous system 100. If the network management system 107 detects that conditions for a network fault have been met, the network management system 107 can register the network fault as an incident. The incident can be assigned to a predetermined category, and the network management system 107 can score and rank the incident within the category. The network management system 107 can also use a combined ranking mechanism to rank a plurality of registered incidents across a plurality of categories. The ranking of each incident across the plurality of categories can represent the importance of the severity of each incident.

Figure 3:
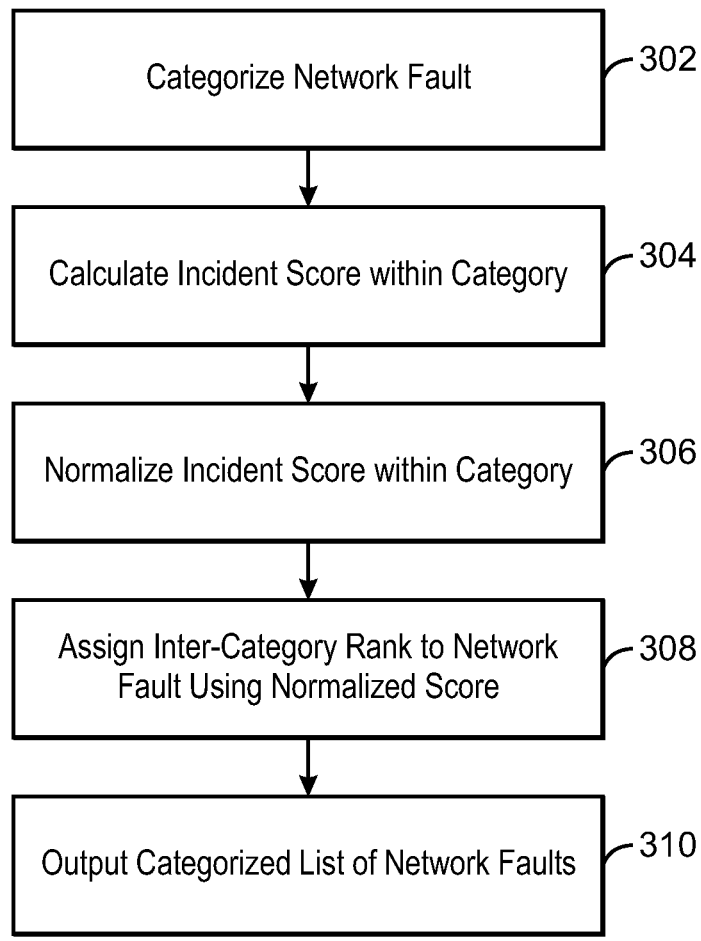
FIG. 3 is a process flow chart of a method to prioritize network faults.

FIG. 3 is a process flow chart of a method to prioritize network faults. The method 300 can be performed by the network management system in a large network. The method can rank network faults spanning multiple categories to ensure that the most severe cases receive the highest priority.

At block 302, the network management system classifies a network fault into a category. In some embodiments, the categories include network failures, performance faults, security violations, and service impacts. The exact process for ranking a network fault may differ depending on which category the network fault belongs to. In some embodiments, certain categories may hold priority over other categories.

At block 304, the network management system calculates an incident score for the network fault. The algorithm for calculating the incident score can be unique to the category, and can be used to provide the network fault with an intra-category ranking, or ranking within the category.

If the network fault is a failure at a link or a node, then the network fault is placed into the network failures category. The calculation of the incident score can be dependent on whether the network fault occurs at a link between nodes, or at a node supporting one or more links.

If the network fault occurs at a link, then the incident score is determined by the type of interface supporting the link. The incident score assigned to a specific network fault may be a function of the importance of the link to the proper functioning of the network as a whole. Thus, faults corresponding to L2 and L3 links connecting nodes in a local network may be assigned a relatively low incident score, whereas a fault corresponding to a link between local networks or between autonomous systems may be assigned a relatively high score. For example, a network fault corresponding to simple L2 or L3 link connecting nodes in a local network may be assigned a score value of 1, whereas a network fault corresponding to a link between local networks or between autonomous systems may be assigned a score value of 5. A network fault corresponding to an interface between a provider edge router and a customer edge router may be assigned an incident score value of 5. The specific score values specified for faults corresponding to different link types may vary according to the design considerations for a particular implementation.

If the network fault occurs at a node, then the incident score can be determined by the type of node and by the type of links supported by the node. In some embodiments, the incident score can be a product of two values: node type and node weight.

The node type, as referred to herein, is a score value indicating the type of node. The node score assigned to a specific network fault may be a function of the importance of the node to the proper functioning of the network as a whole. Thus, faults corresponding to end nodes in a local network may be assigned a relatively low score, whereas a fault corresponding to a router representing a local network or autonomous system may be assigned a relatively high score. For example, a network fault corresponding to an end node of a local network such as a computer, server, or data storage device may be assigned a score value of 1, and a network fault corresponding to a switcher may be assigned a score value of 5. Meanwhile, a network fault corresponding to a router representing an entire local network or a customer edge router may be assigned a score value of 10. A network fault corresponding to a provider edge network may be assigned a score value of 20.

The node weight, as referred to herein, is the sum of the score values assigned to the links supported by the node. The node weight assigned to a specific network fault may be a function of the importance of the node-supported links to the proper functioning of the network as a whole. Thus, faults corresponding to nodes containing links connecting end nodes may be assigned a relatively low score, whereas a fault corresponding to a node containing a link between local networks or autonomous systems may be assigned a relatively high score. For example, a network fault corresponding to a node may be assigned a node weight value that is increased by 1 for each L2/L3 link, and by 5 for each inter-AS or inter-region link.

Another category is performance faults. The network management system can monitor a number of measured variables related to network performance. Examples of measured variables can include round trip time, packet loss percentage, jitter, Voice over Internet Protocol (VoIP) Mean Opinion Score (MOS), interface utilization, and CPU utilization. Each measured variable can have a threshold value. If the threshold value is breached, then a network fault corresponding to the associated measure variable is registered and assigned to the performance faults category.

The incident score can be calculated as a product of a weight value and a threshold deviation point value. The weight value is a score value indicating the importance of the measured variable in relation to other measured variables. For example, VoIP MOS may have a weight value of 10 and round trip time may have a weight value of 5, making VoIP MOS more important than round trip time. The threshold deviation point value is a point value assigned based on the range of degree of deviation of the measured variable from the threshold specified for the measured variable. In some embodiments, the threshold deviation point value is positively correlated with the degree of deviation from the threshold. For example, if the measured variable deviates between 0% and 5% from the threshold, then the threshold deviation point value can be assigned a value of 2. If the deviation is 60-65%, then the threshold deviation point value can be assigned a value of 16. The rate at which the threshold deviation point value increases as a function of degree of deviation may vary depending on the measured variable type.

Another criterion that may affect the incident score is the duration of the threshold breach. If the threshold breach is a persistent-continuous breach as opposed to a point threshold breach, then the weight value may be adjusted to be higher, depending on the amount of time that the threshold breach lasted.

If the network fault is an excessive flow of traffic that results in a Denial-of-Service (DoS), then the network fault is placed into the security violations category. The incident score for security violations may depend on a number of variables such as the location of the excessive flow of traffic.

If the network fault is a failure of a deployed service, then the network fault is placed into the service impacts category. Examples of deployed services can include virtual private network (VPN) and video, audio, or IP telephony. The incident score for service impacts can be dependent on the relative of the deployed service offered to customers. For example, a deployed service in which customers pay premium for may be weighed more heavily than a deployed service that is offered to customers cheaply.

At block 306, the network management system normalizes the incident score in relation to other incident scores within the category. This process produces a normalized score which can be used to rank the network fault against other network faults in other categories. The normalized score can be determined using the network fault's intra-category ranking. In one embodiment, the normalized score is calculated using the formula: Normalized Score=$(N-R_i+1)/N$, wherein N represents the total number of ranks in the category, and $R_i$ represents the current intra-category rank of the network fault. A high intra-category ranking in a category with many other network faults would produce a high normalized score. In some embodiments, the normalized score may be multiplied with a category weight factor to give more priority to certain categories. If network faults in a first category are more severe than network faults in other category, then the network faults in the first category may be assigned a relatively high category weight value. For example, if service impacts are more severe than network failures, then the service impacts category can be assigned a category weight factor of 5 while the network failures category is assigned a category weight factor of 1.

At block 308, the network management system assigns an inter-category rank to the network fault based upon the network fault's normalized score. For example, the normalized score of the network fault is compared to the normalized scores of other network faults spanning all eligible categories to provide the network fault with the inter-category rank. The inter-category rank can serve as an indicator of how important or severe the network fault is in relation to all other network faults.

At block 310, the network management system outputs a categorized list of network faults. For example, the list of network faults may be save to a file, displayed on a graphical user interface, printed, or in some other way, made accessible to a user such as a system administrator. The list of network faults may display the inter-category rankings assigned to the network faults so that the user can identify which network faults are most severe and should be addressed first. The list of network faults may also display the categories that each network fault belongs to.

Figure 4:
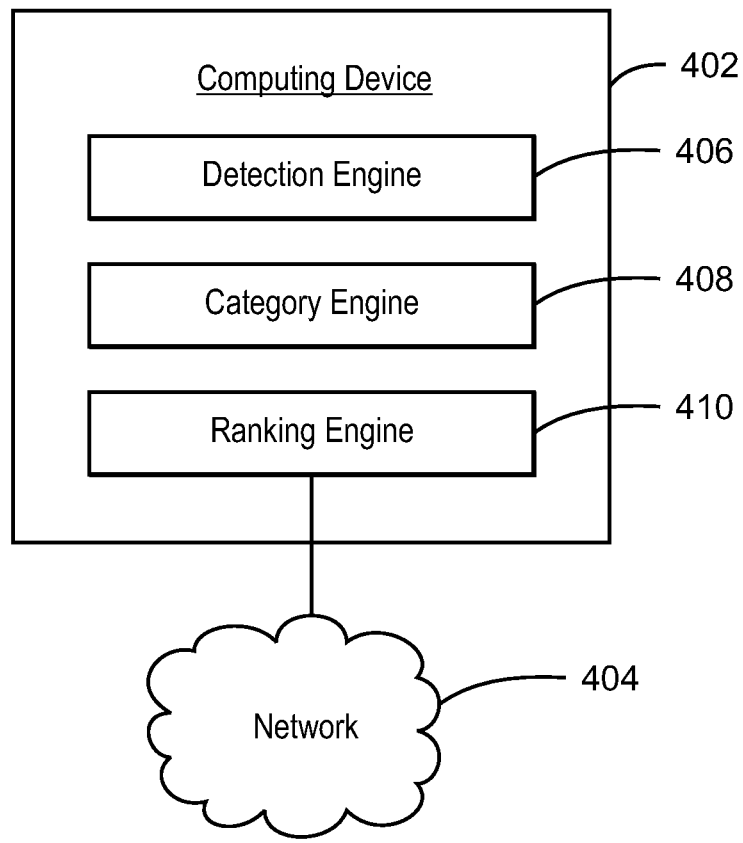
FIG. 4 is a block diagram of a system for detecting and prioritizing network faults.

FIG. 4 is a block diagram of a system for detecting and prioritizing network faults. The system 400 can include a computing device 402 communicatively coupled to a network 404. The computing device 402 can be a desktop computer, a server, a laptop computer, or any other suitable electronic device configured to store information and process instructions. The computing device 402 includes engines for detecting and prioritizing network faults, including a detection engine 406, a category engine 408, and a ranking engine 410. Each engine 406-410 includes a combination of hardware and programming. For example, the engine hardware can be a non-transitory, computer-readable medium for storing the instructions, one or more processors for executing the instructions, or a combination thereof.

The engines 406, 408, and 410 are configured to perform the process of prioritizing network faults, as discussed above in relation to FIGS. 1-3. For example, the detection engine 406 can detect a network fault. The category engine 408 can assign a category to the network fault. The ranking engine 410 can assign an intra-category ranking to the network fault and determine an inter-category ranking of the network fault based on the intra-category ranking.

Figure 5:
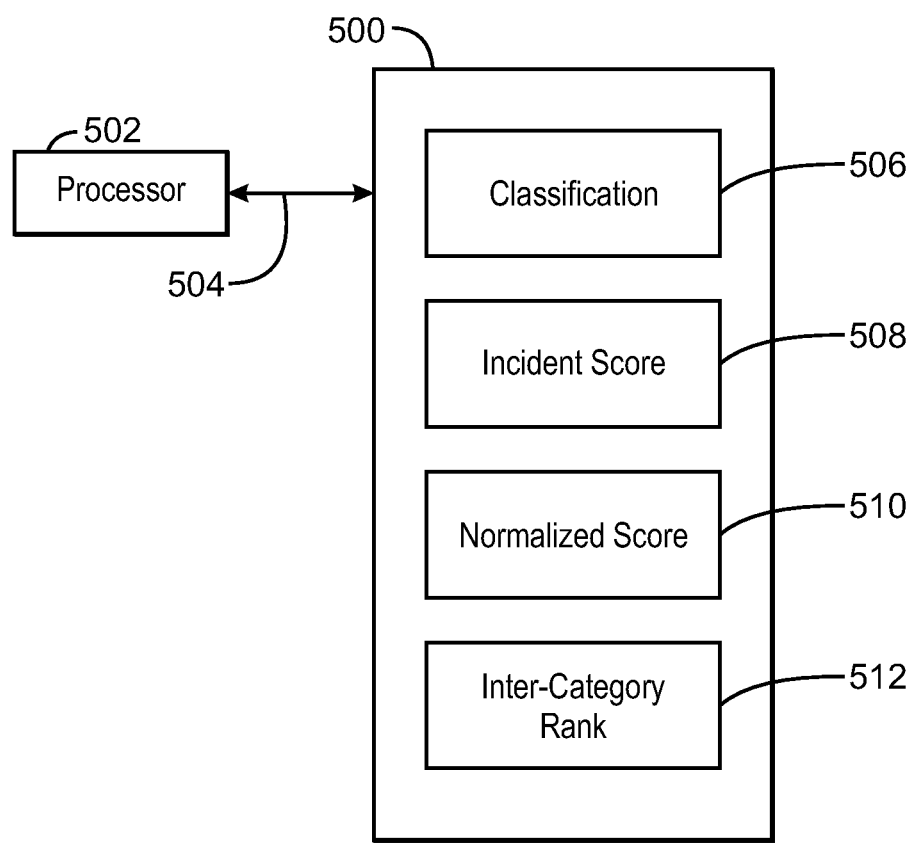
FIG. 5 is a block diagram of a tangible, non-transitory, computer-readable medium containing code for prioritizing network faults.

FIG. 5 is a block diagram of a tangible, non-transitory, computer-readable medium containing code for prioritizing network faults. The tangible, computer-readable medium is referred to by the reference number 500. The tangible, non-transitory, computer-readable medium 500 can comprise RAM, a hard disk drive, an array of hard disk drives, an optical drive, an array of optical drives, a non-volatile memory, a universal serial bus (USB) drive, a digital versatile disk (DVD), or a compact disk (CD), among others. The tangible, non-transitory, computer-readable medium 500 may be accessed by a processor 502 over a computer bus 504. Furthermore, the tangible, non-transitory, computer-readable medium 500 may include code configured to perform the methods described herein.

As shown in FIG. 5, the various components discussed herein can be stored on the non-transitory, computer-readable medium 500. A first region 506 on the tangible, non-transitory, computer-readable medium 500 can include a classification module for classifying a network fault into a category. A region 508 can include an incident score module for calculating an incident score for the network fault in order to provide an intra-category ranking for the network fault. A region 510 can include a normalized score module for normalizing the incident score in relation to other network faults in the category. A region 512 can include an inter-category rank module for assigning an inter-category rank to the network fault based on the network fault's normalized score. Although shown as contiguous blocks, the software components can be stored in any order or configuration. For example, if the tangible, non-transitory, computer-readable medium 500 is a hard drive, the software components can be stored in non-contiguous, or even overlapping, sectors.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A system, comprising:
   a detection engine hardware to detect a plurality of a network faults;
   a category engine hardware to assign a category of plurality categories to each network fault; and
   a ranking engine hardware to assign an intra-category ranking to each network fault based on an incident score and determine an inter-category ranking of each network fault based on the intra-category ranking.

2. The system of claim 1, the ranking engine hardware to generate a normalized score for each network fault, the normalized score based on the intra-category ranking and the number of other network faults in the category.

3. The system of claim 2, the ranking engine hardware to: assign a category weight value to the category, the category weight value based on the category's priority in relation to other categories; and
   calculate the inter-category score by multiplying the normalized score by the category weight value, the inter-category score used to determine each network fault's inter-category ranking.

4. The system of claim 1, wherein each network fault is a node failure, the ranking engine hardware to:
   assign a node type value to the node supporting one or more links, the node type value based on the node's type;
   assign a link value to each of the one or more links, the link value based on the link's type;
   calculate a node weight value by summing the values of each of the one or more links; and
   calculate the incident score by multiplying the node type value by the node weight value.

5. The system of claim 1, wherein each network fault is a link failure, the ranking engine hardware to determine the incident score by assigning a link value to the link, the link value based on the link's type.

6. The system of claim 1, wherein each network fault is a breach of a threshold of a measured variable, the ranking engine hardware to assign a weight value to the measured variable;

select a point value based on an amount of deviation from the threshold; and calculating the incident score by multiplying the point value by the weight value.

7. A method, comprising:

assigning a category to each network fault in a plurality of detected network faults;

determining an incident score for each network fault within the category of plurality categories; generating a normalized score by normalizing the incident score with a plurality of other incident scores in the category; and using the normalized score to rank each network fault among a plurality of other network faults of different categories.

8. The method of claim 7, further comprising:

assigning a category weight value to the category, the category weight value based on the category's priority in relation to other categories; and multiplying the normalized score by the category weight value prior to ranking each network fault among a plurality of other network faults of different categories.

9. The method of claim 7, wherein each network fault is a failure occurring at a node supporting one or more links, and the category is network failures, the incident score to be determined by:

assigning a node type value to the node, the node type value based on the node's type;

assigning a link value to each of the one or more links, the link value based on the link's type;

calculating a node weight value by summing up the values of each of the one or more links; and multiplying the node type value by the node weight value.

10. The method of claim 7, wherein each network fault is a failure occurring at a link, and the category is network failures, the incident score to be determined by assigning a score value to a link, the score value based on the link's type.

11. The method of claim 7, wherein each network fault is a breach of a threshold for a measured variable, and the category is performance faults, the incident score to be determined by: assigning a weight value to the measured variable for the threshold;

selecting a threshold deviation point value based on an amount of deviation from the threshold for the measured variable; and multiplying the point value by the weight value.

12. The method of claim 7, wherein each network fault is an excessive flow of traffic resulting in Denial-of-Service, and the category is security violations.

13. The method of claim 7, wherein each network fault is an error of a deployed service, and the category is service impact, the incident score to be at least partially determined by relative importance of the deployed service to a customer.

14. A non-transitory tangible-computer-readable medium, comprising code to:

assign a first category to a first network fault of a plurality of detected network faults;

determine a first incident score for the first network fault within the first category of plurality categories;

generate a normalized score by normalizing the first incident score with a plurality of incident scores in the first category; and use the normalized score to rank the first network fault among the plurality of detected network faults spanning a plurality of categories.

15. The non-transitory tangible-computer-readable medium of claim 14, further comprising code to:

assign a category weight value to the category, the category weight value based on the category's priority in relation to other categories; and multiply the normalizing score by the category weight value prior to ranking each network fault among a plurality of other network faults of different categories.

16. The non-transitory tangible-computer-readable medium of claim 14, wherein the network failure is a failure occurring at a node supporting one or more links, and the category is network failures, the incident score to be determined by:

assigning a node type value to the node, the node type value based on the node's type;

assigning a link value to each of the one or more links, the link value based on the link's type;

calculating a node weight value by summing up the values of each of the one or more links; and multiplying the node type value by the node weight value.

17. The non-transitory tangible, computer-readable medium of claim 14, wherein each network fault is a failure occurring at a link, and the category is network failures, the incident score to be determined by assigning a score value to a link, the score value based on the link's type.

18. The non-transitory tangible-computer-readable medium of claim 14, wherein each network fault is a breach of a threshold for a measured variable, and the category is performance faults, the incident score to be determined by:

assigning a weight value to the measured variable for the threshold;

selecting a threshold deviation point value based on an amount of deviation from the threshold for the measured variable; and multiplying the point value by the weight value.

19. The non-transitory tangible-computer-readable medium of claim 14, wherein each network fault is an excessive flow of traffic resulting in Denial-of-Service, and the category is security violations.

20. The non-transitory tangible-computer-readable medium of claim 14, wherein each network fault is an error of a deployed service, and the category is service impact, the incident score to be at least partially determined by relative importance of the deployed service to a customer.

* * * * *